Figure 1:
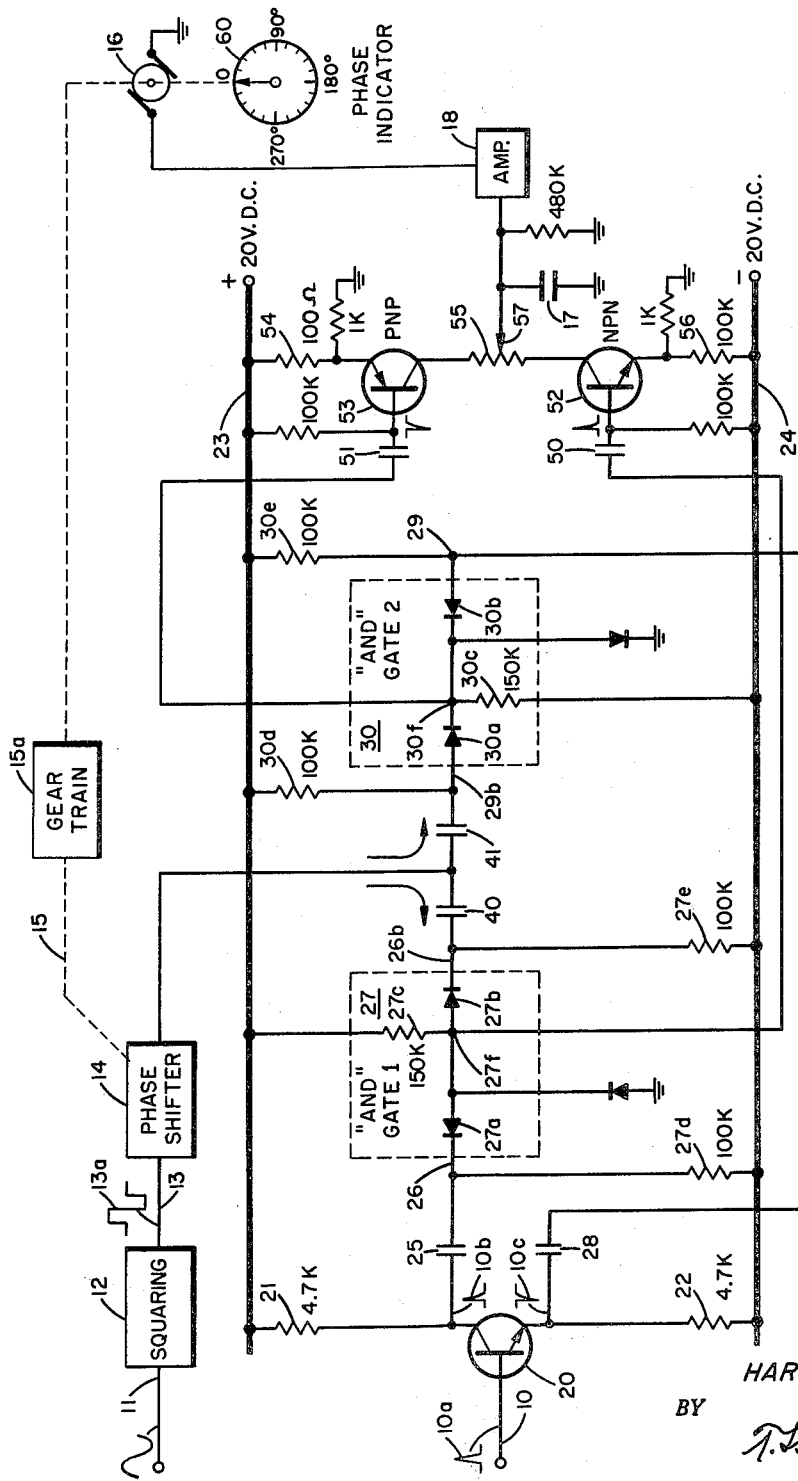

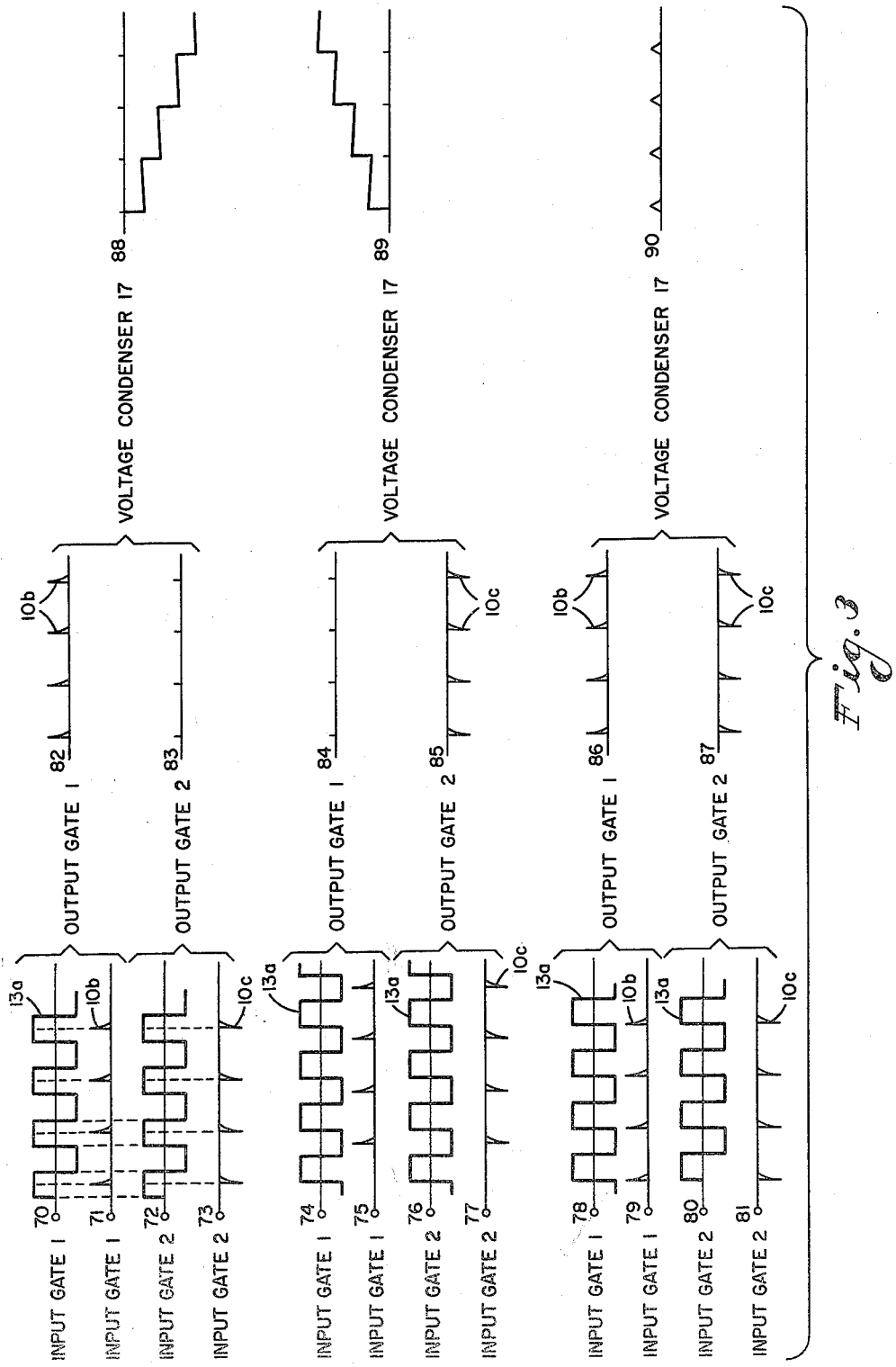

United States Patent Office 3,184,680
Patented May 18, 1965

3,184,680
PULSE-SQUARE WAVE PHASE DETECTOR WITH POLARITY SENSING COINCIDENCE MEANS
Harold T. Bull, Pasadena, Calif., assignor to General Dynamics Corporation, Rochester, N.Y., a corporation of Delaware
Filed Apr. 25, 1960, Ser. No. 24,497
2 Claims. (Cl. 324—83)

This invention relates to phase indicators and is particularly directed to means for indicating the relative phase of an alternating current wave and a train of relatively short pulses of like frequency.

In navigating systems, such as the commercially known Tacan system, a radio beacon with a directional antenna radiates pulses of high-frequency energy, the radiating pattern of which is eccentric or non-uniform in field strength at different points of the compass about the antenna. The antenna, and its field pattern, is rotated about a vertical axis so that at a radio receiver in space the amplitude of the received signal varies more or less sinusoidally in synchronism with the rotation period of the antenna. Further, as the antenna swings through the compass north, a distinct reference pulse is radiated, which pulse is received and demodulated at the receiver. It then becomes a matter of measuring the time phase of the sine wave with respect to the pulse signal to determine the azimuthal or compass position of the receiver with respect to the beacon.

It will be perceived that the accuracy of such a system depends largely on the phase measuring means at the receiver. It is impractical to derive a signal indicative of the crest of the sine wave because, generally, the crest is quite flat and the true high point of the wave is difficult to find. Likewise, the crossover or zero voltage point of the sine wave is unpredictable and is unreliable for navigation purposes, particularly since the waveform received may deviate from that of a smooth symmetrical sine wave.

It is an object of this invention to provide an improved phase indicator.

Another object of this invention is to provide an improved indicating means for showing the relative phase of an alternating current wave with respect to a train of relatively sharp pulses of like frequency.

The objects of this invention are attained by first converting the sinusoidal alternating current wave to an alternating square wave and then comparing the square wave to the reference pulse wave to obtain sharp distinctive voltages or pulses of either positive or negative polarity depending upon the coincidence of the pulse wave with either the positive- or the negative-going loops of the square A.C. wave. These resulting positive and negative pulses are integrated in a storage condenser, the voltage across which is applied to a reversible motor which will turn in either direction depending upon the polarity of the charge of the condenser. The motor in turn drives a phase shifter for bringing the sharp pulses into coincidence with the vertical sides of the alternating square wave whereupon a sharp clear-cut null results in the voltage across the condenser and the motor and phase shifter comes to rest. The motor shaft additionally drives an indicator of any type for showing the phase shift required to produce the null and, hence, indicating accurately the phase position of the square wave with respect to the reference pulses. The phase indicator may be calibrated in terms of the degrees or points of the compass.

Figure 2:
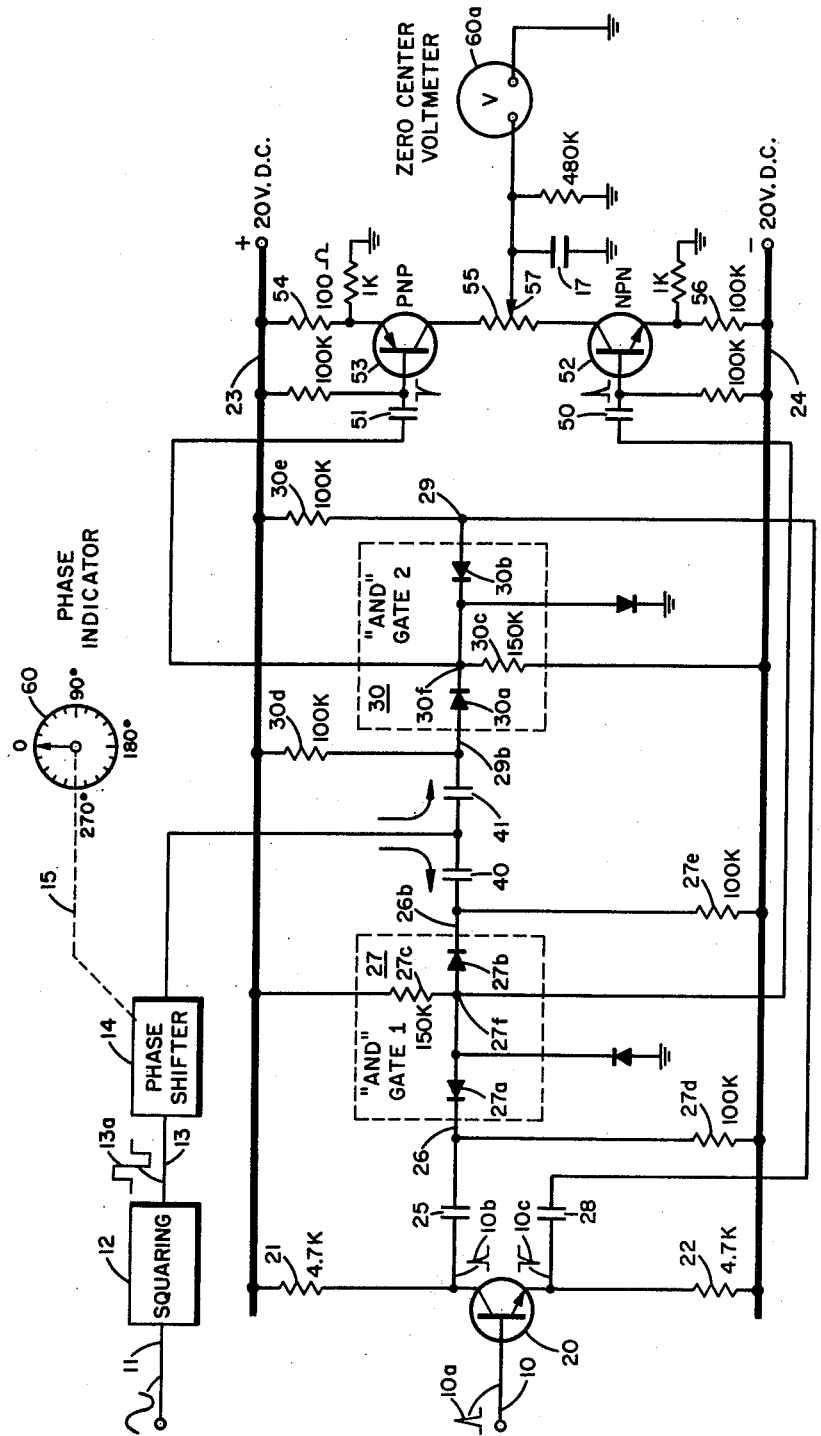

Other objects and features of this invention will become apparent to those skilled in the art by referring to the embodiment described in the following specification and shown in the accompanying drawings, in which:

FIG. 1 is a circuit diagram of a preferred embodiment of this invention;
FIG. 2 is a circuit diagram of another embodiment of this invention; and,
FIG. 3 are voltage diagrams of important voltages at selected points in the circuitry of FIGS. 1 and 2.

In FIG. 1, input terminal 10 is connected to the pulse source such as the reference pulse demodulating circuits of a radio receiver, not shown, of a Tacan type navigating system. Terminal 11, on the other hand, is connected to the demodulator of the same radio receiver which derives the sinusoidal azimuthal sine wave radiated by a beacon. The sine wave, according to this invention, is converted to a square wave of the same frequency in squaring circuit 12. Such a squaring circuit may, conventionally, comprise several stages of amplification, cascaded with clipping circuits for alternately amplifying and clipping sufficiently to produce on lead 13 an alternating square wave with substantially vertical sides. The square wave signal on lead 13 is then applied to the phase shifter 14. The phase shifter 14 may be of many conventional types of which several are shown on page 949 of Termna's "Radio Engineers' Handbook," 1943, McGraw and Hill, and should be capable of shifting the phase of the square wave smoothly from zero to 180 degrees in response to rotation of shaft 15. Shaft 15 is driven in either direction, through a suitable gear train 15a, by reversible motor 16. Alternatively, shaft 15 may be manually adjusted as will appear hereinafter.

In the embodiment shown in FIG. 1, the direction and speed of motor 16 is determined by the polarity and voltage of the electric charge stored in storage condenser 17. Amplifier 18 is employed to sufficiently amplify the energy stored in condenser 17 to drive the motor. Amplifier 18 may be of the direct current type or where considerable gain is required the direct current voltage sampled at the terminals of the condenser may be converted to alternating current by a chopper and then amplified to the desired energy level. In case of chopping and A.C. amplification, motor 16 may conveniently comprise a two-phase reversible type.

According to this invention, the polarity of the charge in condenser 17 is determined by the phase relationships of the pulse 10a at terminal 10 with respect to the positive or negative loops of the square wave 13a. In the particular embodiment shown in FIG. 1, pulses 10a are positive-going and are applied to the base of transistor 20, which is of the N-P-N type. The emitter-collector path of transistor 20 is connected in series with load resistors 21 and 22, as shown, between the positive bus bar 23 and the negative bus bar 24. When the positive-going pulse 10a is applied to the base, the collector swings positively while the emitter swings negatively, thus simultaneously producing a positive and a negative replica of pulse 10a. The positive pulse is coupled through condenser 25 to one input lead 26 of the first AND gate 27. The negative pulse at the emitter, on the other hand, is coupled through condenser 28 to the input terminal 29 of the second AND gate 30.

While the AND, or coincidence, gates 27 and 30 may assume many configurations, the diode-type is preferred and is shown. Diodes 27a and 27b are connected back-to-back and at their junction 27f to the positive bus bar 23 through resistor 27c. The outer terminals of the diodes are connected through resistors 27d and 27e to the negative bus bar 24. Accordingly, the diodes are normally conductive and junction 27f will remain undisturbed at some potential, determined by the relative values of the resistors, until both diodes 27a and 27b are simultaneously back biased to interrupt all forward current. When this coincidence of positive voltages occurs at the two input terminals of the AND gate, the junction 27f swings positively for the duration of the pulse 10a.

The square wave 13a is coupled through coupling condenser 40 to input terminal 26b of AND gate 27. The square wave is coupled through coupling condenser 41 to input terminal 29b of AND gate 30.

AND gate 30 is similar to AND gate 27 except that the diodes 30a and 30b are polarized to respond only to negative-going pulses. Current normally flows through resistors 30c and hence through the diodes and through resistors 30d and 30e to slightly forward bias diodes 30a and 30b. Current is interrupted only when negative voltages are simultaneously applied to input terminals 29 and 29b, whereupon junction 30f dips negatively for the duration of pulse 10a.

Next, the output circuits of the two AND gates, at junctions 27f and 30f, are coupled, respectively, through coupling condensers 50 and 51 to the bases of transistors 52 and 53. Transistor 52, according to an important feature of this invention, is of the N-P-N type while transistor 53 is of the P-N-P type, with the bus bar polarities shown. The emitter-collector circuits of transistors 52 and 53 function in effect as series connected switches in a potentiometer bridged across the buses 23 and 24. That is, resistors 54, 55 and 56 are connected in series with the emitter-collector circuits of transistors 52 and 53 across the bus bars. Normally, both transistors are non-conducting. Transistors 52 becomes conducting in response to a positive voltage on its base to effectively connect the sliding contact 57 and the upper terminal of condenser 17 to the negative bus 24. Transistor 53, on the other hand, connects sliding contact 57 to the positive bus 23 only in response to a negative-going voltage on the base of transistor 53. Inasmuch as pulses on the bases of transistors 52 and 53 cannot occur at the same time, except as hereinafter set forth condenser 17 can be charged in one direction only, depending upon the coincidence of pulse 10a with either the positive or the negative loops of alternating wave 13a. Since the inertia of the servo system, including the inertia of motor 16 and its driven gear train, causes a lag in the response to changes in polarity of voltage across condenser 17, it can be expected that a train of pulses 10a will appear in phase with the loops of the wave 13a of one polarity before the phase shifter can be moved to reduce the error signal. It follows that the charge on condenser 17 will build-up in steps in response to the output of either AND gate until the voltage of either bus is reached, or until the phase shifter has sufficiently shifted the phase of wave 13a to actuate the opposite AND gate. When the square wave 13a has been shifted to bring the pulse 10a into registry with the vertical side of the square wave, the two AND gates become equally responsive, both transistors 52 and 53 switch in unison, and the charge on condenser 17 assumes a null or middle value between the voltages of the two buses. Then, motor 16 comes to rest, and the phase indicator 60 can be read to determine the rotational position of the shaft 15 and, hence, the phase relationship of the pulse 10a and A.C. wave 13a.

Alternatively, the shaft 15a may be rotated manually, as shown in FIG. 2, in which case the phase indicator would preferably comprise, for example, a zero center voltmeter 60a connected directly across the condenser 17 to indicate positive or negative voltage as well as the null voltage across condenser 17. In this case also, the rotational position of shaft 15 would be calibrated in terms of phase angle.

The operation of the phase detector of FIGS. 1 and 2 is clearly demonstrated in the family of voltage waves of FIG. 3. In FIG. 3, two out-of-phase relationships of the pulse wave and square wave are demonstrated as well as one in-phase relationship. When the pulse wave, shown on line 71, is in-phase with the positive loops of the square wave, on line 70, at the two input circuits of gate 1, the output of that gate, shown on line 82, will contain positive-going pulses. These positive-going pulses are applied to the base of transistor 52. The condenser 17 is connected to the negative bus bar 24 during the interval of each pulse supplied to the base and the condenser charges step-by-step, as shown on line 88. Depending on the ohmic value of the leakage paths across the condenser, the charge on the condenser will decay more or less between each step in voltage.

If, now, the phase of the square wave is shifted so that the pulses occur during the negative loops of the square wave, as shown on lines 74, 75, 76 and 77, there appears negative-going pulses only at the output of gate 2, as shown on line 85. This output is applied to transistor 53 which responds to the negative-going pulses and repetitiously connects the storage condenser 17 to the opposite bus bar 23. Thereupon, the storage condenser charges in the opposite direction step-by-step, as shown on line 89 of FIG. 3.

Finally, let the phase of the square wave be adjusted so that the vertical sides of the square wave are in-phase with the relatively sharp pulses 10a, as shown on lines 78, 79, 80 and 81. There appears then pulses at the outputs of both gates. The pulses are of opposite polarity, as shown on lines 86 and 87, and when applied simultaneously to the two transistors 52 and 53, no net charging in the storage condenser results, as shown on line 90 of FIG. 3. It becomes apparent now that the slightest deviation from the precise in-phase relations of lines 78—81 there appears a strong positive or a strong negative error signal cross condenser 17. Inasmuch as the reference pulse 10a is quite narrow and may have a width of the order of a few microseconds, the phase relation of the sinusoidal wave at input 11 and the square wave, on line 13, is determined with a reliability and accuracy heretofore unattainable.

When the transistor 20 is of the commercially available type 2N333, transistor 53 is of the 2N1036 type, and transistor 52 is of the 2N333 type, and the diodes are of the 1N625 type, the specific resistor values, shown in FIG. 1, have produced excellent results.

Many modifications can, of course, be made in the specific circuitry shown and in the parameters suggested without departing from the spirit or scope of this invention as defined in the following claims.

What is claimed is:

1. A detector for producing a positive D.C. voltage or a negative D.C. voltage in response, respectively, to lag and lead phase relation of recurring relatively narrow pulses and an A.C. wave of like frequency, said detector comprising a source of said recurring pulses and a source of said A.C. wave, means for adjustably shifting the phase of the signal of one of said sources, a first and a second coincidence gate for generating, respectively, positive-going and negative-going pulses, connections from said A.C. source to one input terminal of each of said gates, connections from said source of pulses to other input terminals of each of said gates, means for reversing the polarity of the pulses applied to one of said gates with respect to the polarity of the pulses applied to the other of said gates for producing a pulse at the output of one gate only depending upon the coincidence in time of voltages of like polarity at the input terminals of said one gate, a potentiometer comprising two transistors, said transistors being of the P-N-P and N-P-N types with the collector-emitter circuits connected in series across a D.C. potential source, a storage condenser connected between a point of fixed reference voltage and a point on said potentiometer between said transistors so that said condenser can be effectively connected to either terminal of said D.C. potential source by rendering either transistor conductive, and connections, respectively, between the control electrodes of said transistors and the output terminal of said first and second gate.

2. A system for measuring the phase relationship between two signals at least one of which alternates in polarity, said system comprising, sources for providing said two signals, means for generating in response to the relative polarities of said signals with respect to each other two series of pulses of, respectively, positive-going and negative-going voltages, an N-P-N type transistor and a P-N-P type transistor, two buses of different D.C. voltages of relatively opposite polarity with respect to ground, the emitter-collector circuits of said transistors being coupled in series between said buses, a storage condenser, said storage condenser being connected between the junction of said transistors and ground, and means for applying said series of pulses, respectively, to the bases of said transistors to alternately connect said condenser to either bus.

References Cited by the Examiner
UNITED STATES PATENTS

| | | | |
|---|---|---|---|
| 2,429,636 | 10/47 | McCoy | 324—89 X |
| 2,454,807 | 11/48 | Kennedy | 324—87 X |
| 2,564,682 | 8/51 | Fisk et al. | 324—89 X |
| 2,577,668 | 12/51 | Wilmotte et al. | 324—89 X |
| 2,769,969 | 11/56 | Comstock | 324—83 |
| 2,781,489 | 2/57 | Petrides. | |
| 2,851,662 | 9/58 | True et al. | 324—83 |
| 2,901,612 | 8/59 | Dwork et al. | |
| 2,921,261 | 1/60 | King et al. | 324—83 |
| 2,930,942 | 3/60 | Levine et al. | 317—148.5 |
| 2,956,172 | 10/60 | Torkildsen | 307—88.5 |
| 2,989,652 | 6/61 | Hall | 317—148.5 |
| 2,995,735 | 8/61 | Frank | 317—148.5 |
| 3,021,545 | 2/62 | Pickens | 317—148.5 |

FOREIGN PATENTS 781,028   8/57   Great Britain.

WALTER L. CARLSON, *Primary Examiner.*
LLOYD McCOLLUM, SAMUEL BERNSTEIN,
*Examiners.*